US008196566B2

(12) United States Patent
Matsuura

(10) Patent No.: US 8,196,566 B2
(45) Date of Patent: Jun. 12, 2012

(54) VOLTAGE GENERATOR

(75) Inventor: Yuichiro Matsuura, Kariya (JP)

(73) Assignee: Denso Corporation, Kariya (JP)

( * ) Notice: Subject to any disclaimer, the term of this patent is extended or adjusted under 35 U.S.C. 154(b) by 212 days.

(21) Appl. No.: 12/213,148

(22) Filed: Jun. 16, 2008

(65) Prior Publication Data

US 2008/0316670 A1 Dec. 25, 2008

(30) Foreign Application Priority Data

Jun. 22, 2007 (JP) ................................. 2007-165109

(51) Int. Cl.
*F02M 51/00* (2006.01)
*F16K 3/02* (2006.01)
*H01H 47/00* (2006.01)

(52) U.S. Cl. .................... 123/490; 251/129.15; 361/155

(58) Field of Classification Search .................. 123/490, 123/499, 478, 480; 251/129.15; 701/104, 701/105; 361/152, 154–156, 158
See application file for complete search history.

(56) References Cited

U.S. PATENT DOCUMENTS

| | | | | |
|---|---|---|---|---|
| 4,327,693 | A * | 5/1982 | Busser | 123/490 |
| 4,435,745 | A | 3/1984 | Eisele et al. | |
| 4,479,161 | A * | 10/1984 | Henrich et al. | 361/154 |
| 4,486,703 | A * | 12/1984 | Henrich | 323/222 |
| 5,502,370 | A * | 3/1996 | Hall et al. | 323/284 |
| 5,552,694 | A * | 9/1996 | Appeltans | 323/222 |
| 5,982,604 | A * | 11/1999 | Kojima et al. | 361/159 |
| 5,994,885 | A * | 11/1999 | Wilcox et al. | 323/285 |
| 6,332,454 | B1 | 12/2001 | Itabashi et al. | |
| 6,390,082 | B1 * | 5/2002 | Duffy et al. | 123/682 |
| 6,407,593 | B1 | 6/2002 | Kawamoto et al. | |
| 6,677,734 | B2 * | 1/2004 | Rothleitner et al. | 323/259 |
| 6,781,353 | B2 * | 8/2004 | Rozsypal | 323/224 |
| 7,312,968 | B2 * | 12/2007 | Kahara et al. | 361/93.1 |
| 7,443,152 | B2 * | 10/2008 | Utsunomiya | 323/284 |
| 7,778,765 | B2 * | 8/2010 | Toyohara et al. | 701/105 |
| 7,784,445 | B2 * | 8/2010 | Takahashi et al. | 123/479 |
| 2008/0093172 | A1 * | 4/2008 | Albertson et al. | 184/6.4 |
| 2008/0184968 | A1 * | 8/2008 | Matsuura | 123/490 |
| 2008/0289608 | A1 * | 11/2008 | Matsuura et al. | 123/490 |

FOREIGN PATENT DOCUMENTS

EP 1 176 287 1/2002

OTHER PUBLICATIONS

Extended European Search Report dated Mar. 10, 2010, issued in corresponding European Application No. 08010519.0-2207.

* cited by examiner

*Primary Examiner* — Mahmoud Gimie
*Assistant Examiner* — David Hamaoui
(74) *Attorney, Agent, or Firm* — Nixon & Vanderhye P.C.

(57) ABSTRACT

A voltage generator used to generate a voltage for driving a vehicle fuel injector includes a microcomputer, a coil, and a capacitor. The microcomputer calculates an interval at which the fuel injector is driven. When the interval is less than or equal to a predetermined time period, the microcomputer causes a first current to flow through the coil so that the capacitor is charged to a first level by counterelectromotive force produced in the coil. When the interval is greater than the time period, the microcomputer causes a second current less than the first current to flow through the coil so that the capacitor is charged to a second level less than the first level. The fuel injector is driven by the capacitor voltage.

23 Claims, 6 Drawing Sheets

VOLTAGE GENERATOR

CROSS REFERENCE TO RELATED APPLICATION

This application is based on and incorporates herein by reference Japanese Patent Application No. 2007-165109 filed on Jun. 22, 2007.

FIELD OF THE INVENTION

The present invention relates to an on-board voltage generator mountable on a vehicle.

BACKGROUND OF THE INVENTION

Typically, a vehicle is equipped with a DC-DC converter that boosts a direct current (DC) voltage of a vehicle battery to generate a driving voltage for driving a fuel injector. In a conventional DC-DC converter disclosed in, for example, U.S. Pat. No. 6,407,593 corresponding to JP-A-2001-73850, a switching element coupled to a vehicle battery via a coil is turned on and off so that counter-electromotive force can be produced in the coil. A capacitor is charged by the counter-electromotive force, thereby boosting a DC-DC voltage of the vehicle battery.

In the DC-DC converter, the driving voltage decreases after the fuel injector is driven. To prevent this problem, the DC-DC converter is configured such that as large an electric current as possible flows through the coil when the switching element is turned on. In such an approach, when the switching element is turned off, as large counter-electromotive force as possible is produced in the coil so that the driving voltage can rapidly reach a target voltage.

In the DC-DC converter, even when an engine of the vehicle stops, and the fuel injection value is not driven, the driving voltage decreases gradually due to self-discharge of the capacitor. To prevent this problem, the DC-DC converter is configured such that the above-described voltage boost operation is continued even during a period of time when the vehicle engine stops. In such an approach, the vehicle engine can be rapidly restarted.

As described above, since such a conventional DC-DC converter causes a large current to flow through a coil and a switching element, a considerable amount of heat is produced in the coil and the switching element. For example, the DC-DC converter is installed in an engine room of a vehicle. In such a case, while the vehicle is running, a large amount of air is introduced in the engine room. Therefore, the heat generated in the coil and the switching element is dissipated by the air flow so that the coil and switching element can be suitably cooled. However, when the vehicle stops, airflow enough to cool the coil and the switching element cannot be generated. As a result, a temperature of the DC-DC converter may increase significantly, and heat emitted from the DC-DC converter may affect electronic devices located near the DC-DC converter.

SUMMARY OF THE INVENTION

In view of the above-described problem, it is an object of the present invention to provide an on-board voltage generator configured to generate a voltage in such a manner that heat resulting from a voltage generating operation cannot affect an electronic device located near the voltage generator.

According to an aspect of the present invention, an on-board voltage generator includes a coil, a current value set means, a current value measurement means, a switch means, an output voltage generating means, a voltage value measurement means, and a switch control means. The coil is configured such that an energization current having a target current value flows through the coil. The current value set means determines whether a predetermined set condition is true or false. When the set condition is false, the current value set means sets the target current value of the energization current to a first current value. In contrast, when the set condition is true, the current value set means sets the target current value of the energization current to a second current value less than the first current value. The current value measurement means measures an actual current value of the energization current flowing through the coil. The switch means determines whether the actual current value measured by the current value measurement means is less than the target current value set by the current value set means. When the measured actual current value is less than the set target current value, the switch means allows the energization current to flow through the coil. In contrast, when the measured actual current value is equal to or greater than the set target current value, the switch means prevents the energization current from flowing through the coil. The output voltage generating means has a capacitor and generates an output voltage by charging the capacitor by counterelectromotive force produced in the coil. The voltage value measurement means measures a voltage value of the output voltage. The switch control means determines whether the voltage value measured by the voltage value measurement means is less than a predetermined reference voltage value. When the measured voltage value is less than the reference voltage value, the switch control means enables the switch means. In contrast, the switch control means disables the switch means when the measured voltage value is equal to or greater than the reference voltage value.

According to another aspect of the present invention, an on-board voltage generator includes a coil, a switch means, an output voltage generating means, and a control means. The switch means alternately energizes and deenergizes the coil. The output voltage generating means has a capacitor and generates an output voltage by charging the capacitor by counterelectromotive force produced in the coil. The control means enables the switch means, when an internal-combustion engine of the vehicle runs. In contrast, the control means disables the switch means, when the internal-combustion engine stops.

BRIEF DESCRIPTION OF THE DRAWINGS

The above and other objectives, features and advantages of the present invention will become more apparent from the following detailed description made with check to the accompanying drawings. In the drawings.

Figures 5A, 5B, 5C:
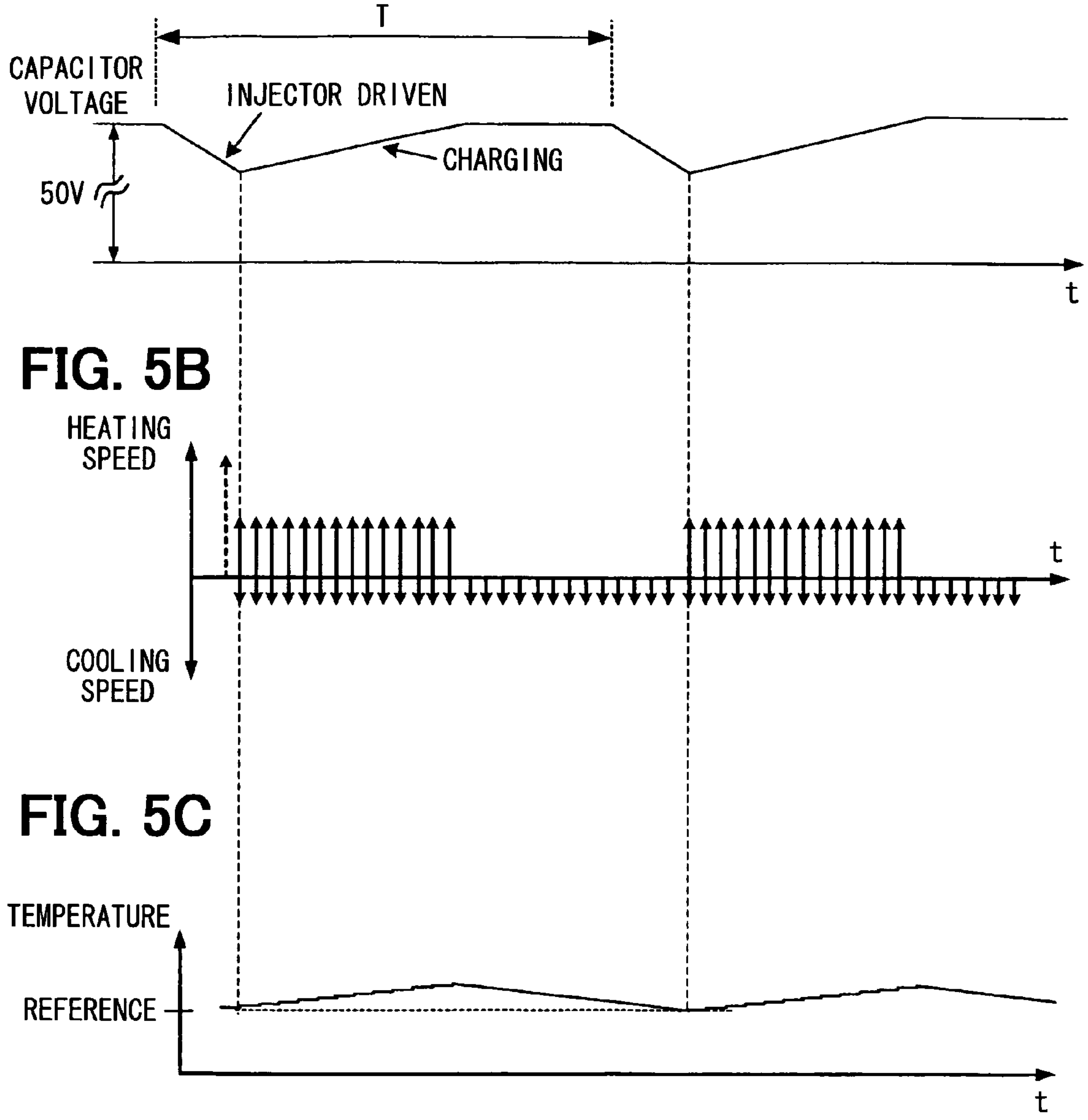
Figure 6:
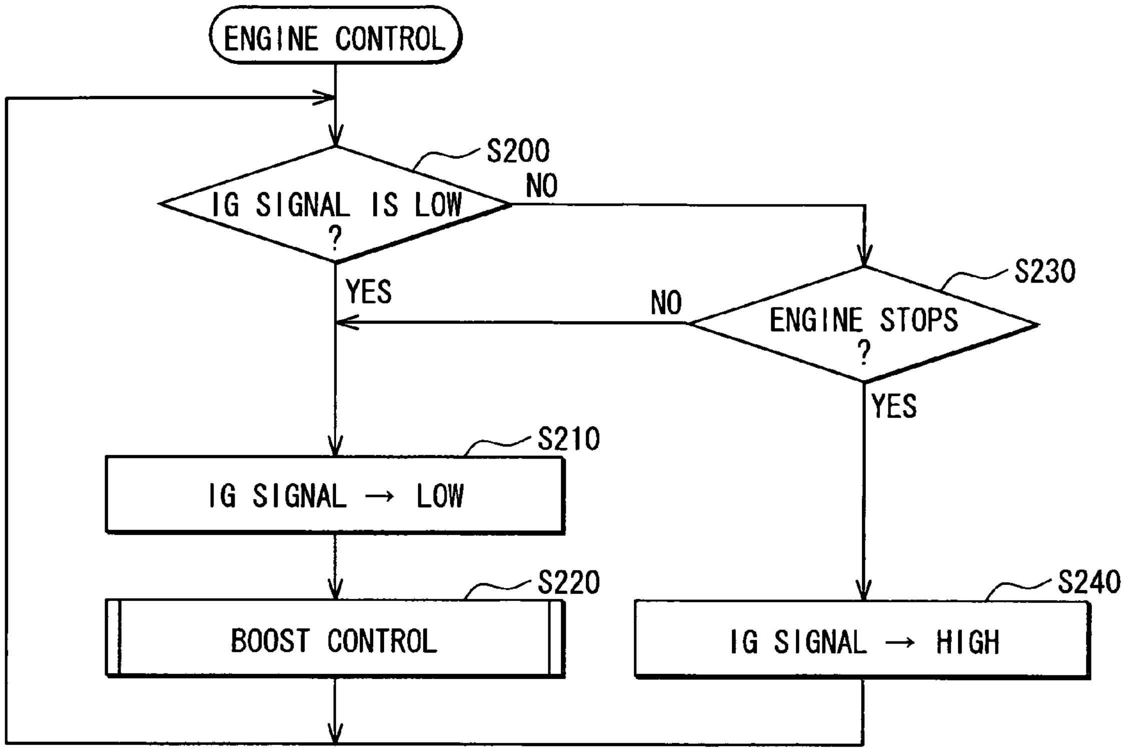

4C is a graph showing a change in a temperature of the voltage booster when the engine runs at high speed;

FIG. 5A is a graph showing the change in the charged voltage of the capacitor in the voltage booster when the engine runs at low speed, FIG. 5B is a graph showing the relationship between the heat generation speed and the heat dissipation speed of the voltage booster when the engine runs at low speed, and FIG. 5C is a graph showing the change in the temperature of the voltage booster when the engine runs at low speed; and FIG. 6 is a flow diagram illustrating an engine control process executed by a microprocessor in an engine electronic control unit according to a second embodiment of the present invention.

DETAILED DESCRIPTION OF THE PREFERRED EMBODIMENTS (First Embodiment)

Figure 1:
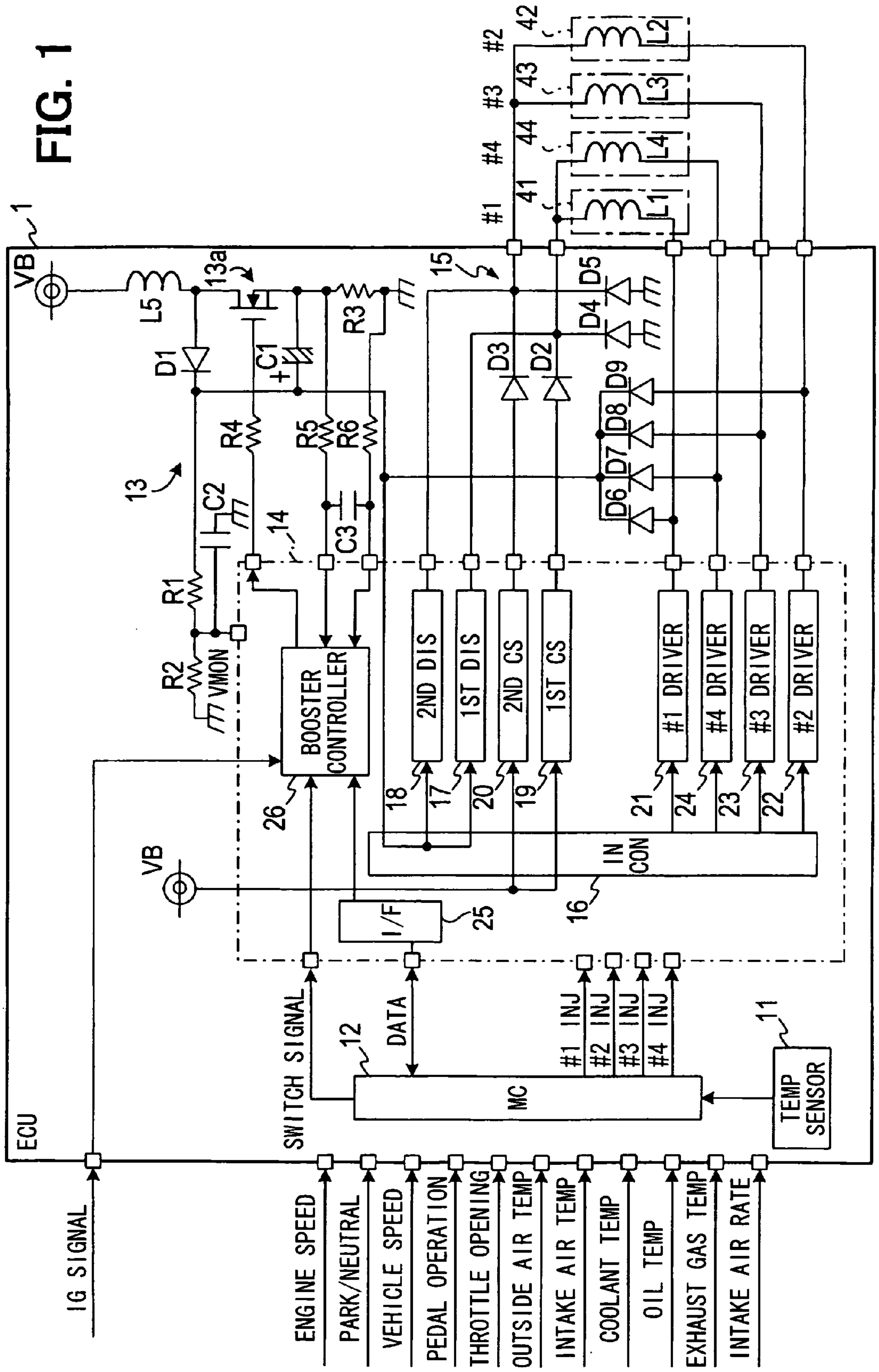
FIG. 1 is a block diagram illustrating an engine electronic control unit according to a first embodiment of the present invention.

An engine electronic control unit (ECU) 1 according to a first embodiment of the present invention is described below with reference to FIG. 1. The engine ECU 1 is installed in an engine room of a vehicle (not shown). Specifically, the engine ECU 1 is mounted in an intake air passage (e.g., air cleaner) to a four-cylinder direct-injection gasoline engine of the vehicle. The engine ECU 1 controls fuel injectors 41-44 that are respectively located at cylinders #1-#4.

The fuel injectors 41-44 are provided with solenoid coils L1-L4, respectively. When the solenoid coils L1-L4 are deenergized, the fuel injectors 41-44 are closed by bias force of springs (not shown) so that fuel cannot be injected into the cylinders #1-#4. In contrast, when the solenoid coils L1-L4 are energized, the fuel injectors 41-44 are opened by electromagnetic force produced in the solenoid coils L1-L4 so that the fuel can be injected into the cylinders #1-#4.

The engine ECU 1 includes a temperature sensor 11, a microcomputer 12, a voltage booster 13, a driver unit 14, and a rectifier unit 15. These components are accommodated in a common housing. The temperature sensor 11 measures an internal temperature inside the engine ECU 1 and outputs an internal temperature signal indicative of the measured internal temperature to the microcomputer 12.

The microcomputer 12 includes a central processing unit (CPU), a read only memory (ROM), a random access memory (RAM), an input and output (I/O) port, a communication interface (I/F), and an analog-to-digital (A/D) converter. The microcomputer 12 performs various processing in accordance with programs stored in the ROM.

Specifically, the microcomputer 12 receives sensor signals from various external sensors in addition to the internal temperature signal, which is received from the temperature sensor 11. Based on the received signals, the microcomputer 12 determines which of the cylinders #1-#4 the fuel is injected into, the fuel injection amount (i.e., period) per injection, setting data to be written (i.e., set) to the driver unit 14, and a diagnosis voltage to diagnose the voltage booster 13.

For example, in the first embodiment, the microcomputer 12 receives an engine speed signal, a parking signal, a neutral signal, a vehicle speed signal, a pedal operation amount signal, a throttle opening signal, an outside air temperature signal, an intake air temperature signal, an engine coolant temperature signal, an oil temperature signal, an exhaust gas temperature signal, and an intake air flow rate signal from the external sensors.

In the engine speed signal, one pulse is created each time a crankshaft of the engine rotates a predetermined degree. The parking signal is a binary signal. When a gear of the vehicle is not in a parking position, a voltage level of the parking signal is set to high. In contrast, when the gear is in the parking position, the voltage level of the parking signal is set to low. Like the parking signal, the neutral signal is a binary signal. When the gear of the vehicle is not in a neutral position, a voltage level of the neutral signal is set to high. In contrast, when the gear is in the neutral position, the voltage level of the neutral signal is set to low. The vehicle speed signal indicates a running speed of the vehicle. The pedal operation amount signal indicates the amount of operation of an acceleration pedal of the vehicle. The throttle opening signal indicates the degree of opening of a throttle of the engine. The outside air temperature signal indicates a temperature outside the vehicle. The intake air temperature signal indicates a temperature of intake air supplied to the engine. The engine coolant temperature signal indicates a temperature of an engine coolant for cooling the engine. The oil temperature signal indicates a temperature of engine oil for lubricating the engine. The exhaust gas temperature signal indicates a temperature of exhaust gas discharged from the engine. The intake air flow rate signal indicates the amount of intake air supplied to the engine.

In accordance with the determination that is based on the received signals, the microcomputer 12 outputs four injection signals #1INJ-#4INJ, the setting data, and a diagnosis voltage switch signal to the driver unit 14.

For example, in the first embodiment, each of the injection signals #1INJ-#4INJ is a binary signal. When the microcomputer 12 causes the fuel injectors 41-44 to be opened, voltage levels of the injection signals #1INJ-#4INJ are set to high. In contrast, when the microcomputer 12 causes the fuel injectors 41-44 to be closed, the voltage levels of the injection signals #1INJ-#4INJ are set to low. The diagnosis voltage switch signal is a binary data. When the microcomputer 12 causes the diagnosis voltage to be set to a first voltage value, a voltage level of the diagnosis voltage switch signal is set to low. In contrast, when the microcomputer 12 causes the diagnosis voltage to be set to a second voltage value less than the first voltage value, the voltage level of the diagnosis voltage switch signal is set to high.

The voltage booster 13 includes a coil L5, a metal-oxide semiconductor field-effect transistor (MOSFET) 13*a*, capacitors C1-C3, a diode D1, and resistors R1-R6. The coil L5 has a first end coupled to a positive terminal VB of a vehicle battery and a second end coupled to a drain of the MOSFET 13*a*.

The MOSFET 13*a* is an N-channel type. A gate of the MOSFET 13*a* is coupled to the driver unit 14 via the resistor R4, and a source of the MOSFET 13*a* is coupled to a negative terminal (i.e., ground) of the vehicle battery via the resistor R3.

The capacitor C1 is an electrolytic capacitor. The capacitor C1 has a positive terminal coupled to the driver unit 14 and a negative terminal coupled to the source of the MOSFET 13*a*.

The diode D1 has an anode coupled to the second end of the coil L5 and a cathode coupled to the positive terminal of the capacitor C1. Further, the cathode of the diode D1 is coupled via a series circuit of the resistors R1, R2 to the ground of the vehicle battery. A voltage appearing across the resistor R2 is inputted as a monitor voltage VMON to the driver unit 14. The monitor voltage VMON is used to monitor a voltage of the capacitor C1.

The capacitor C2 is an electrolytic capacitor. The capacitor C2 has a first terminal coupled to the negative terminal of the vehicle battery and a second terminal coupled to a node between the resistors R1, R2. Thus, the capacitor C2 serves as a low-pass filter circuit.

The resistor R5 has a first end coupled to the source of the MOSFET 13*a* and a second end coupled to the driver unit 14. The resistor R6 has a first end coupled to the negative terminal of the vehicle battery and a second end coupled to the driver unit 14.

The capacitor C3 is a ceramic capacitor and coupled between the second ends of the resistors R5, R6. Thus, the capacitor C3 and the resistors R5, R6 form a low-pass filter circuit.

In the voltage booster 13, a voltage boost operation is performed as follows. The MOSFET 13*a* of the voltage booster 13 is turned on and off in accordance with a voltage signal that is supplied from the driver unit 14 to the gate of the MOSFET 13*a*. As a result, an electrical current intermittently flows through the coil L5, and counter electromotive force is produced in the coil L5. The counter electromotive force is rectified by the diode D1. The capacitor C1 is charged by the rectified counter electromotive force. This voltage boost operation is repeatedly performed so that the voltage booster 13 can generate high voltage (e.g., 50 VDC) greater than a voltage (e.g., 15 VDC) of the vehicle battery.

In the first embodiment, the capacitor C1 is charged by counter electromotive force that is produced in the coil L5 at the moment when the MOSFET 13*a* is turned off. That is, the capacitor C1 is charged by counter electromotive force that maintains an electric current flowing through the coil L5. Therefore, as an electric current flowing through the coil L5 during the ON period of the MOSFET 13*a* is larger, counter electromotive force generated in the coil L5 at the moment when the MOSFET 13*a* is turned off is larger so that a charged voltage of the capacitor C1 can rapidly reach the high voltage.

The driver unit 14 includes an injector controller 16, a first discharge unit 17, a second discharge unit 18, a first constant current source 19, a second constant current source 20, a first cylinder driver 21, a second cylinder driver 22, a third cylinder driver 23, a fourth cylinder driver 24, a communication interface (I/F) 25, and a voltage booster controller 26.

In accordance with the injection signals #1INJ-#4INJ, the injector controller 16 outputs drive signals to the first discharge unit 17, the second discharge unit 18, the first constant current source 19, the second constant current source 20, the first cylinder driver 21, the second cylinder driver 22, the third cylinder driver 23, and the fourth cylinder driver 24, respectively.

Specifically, the injector controller 16 outputs a first drive signal to the first discharge unit 17 for a predetermined time period, when one of the injection signal #1INJ and the injection signal #4INJ changes from low to high. The first discharge unit 17 is activated while receiving the first drive signal. The injector controller 16 outputs a second drive signal to the second discharge unit 18 for a predetermined time period, when one of the injection signal #2INJ and the injection signal #3INJ changes from low to high. The second discharge unit 18 is activated while receiving the second drive signal. Further, the injector controller 16 outputs a third drive signal to the first constant current source 19 during a period of time when one of the injection signal #1INJ and the injection signal #4INJ remains high. The first constant current source 19 is activated while receiving the third drive signal. The injector controller 16 outputs a fourth drive signal to the second constant current source 20 during a period of time when one of the injection signal #2INJ and the injection signal #3INJ remains high. The second constant current source 20 is activated while receiving the fourth drive signal. The injector controller 16 outputs a fifth drive signal to the first cylinder driver 21 during a period of time when the injection signal #1INJ remains high. The first cylinder driver 21 is activated while receiving the fifth drive signal. The injector controller 16 outputs a sixth drive signal to the second cylinder driver 22 during a period of time when the injection signal #2INJ remains high. The second cylinder driver 22 is activated while receiving the sixth drive signal. The injector controller 16 outputs a seventh drive signal to the third cylinder driver 23 during a period of time when the injection signal #3INJ remains high. The third cylinder driver 23 is activated while receiving the seventh drive signal. The injector controller 16 outputs an eighth drive signal to the fourth cylinder driver 24 during a period of time when the injection signal #4INJ remains high. The fourth cylinder driver 24 is activated while receiving the eighth drive signal.

The first discharge unit 17 has a MOSFET (not shown) that is turned on and off in accordance with the first drive signal received from the injector controller 16. A drain of the MOSFET is coupled to the positive terminal of the capacitor C1 of the voltage booster 13, and a source of the MOSFET is coupled to first ends of the solenoid coils L1, L4 of the fuel injectors 41, 44. Therefore, when the MOSFET of the first discharge unit 17 is turned on and off in accordance with the first drive signal, the positive terminal of the capacitor C1 is electrically connected to and disconnected from the first ends of the solenoid coils L1, L4 accordingly.

The second discharge unit 18 has a MOSFET (not shown) that is turned on and off in accordance with the second drive signal received from the injector controller 16. A drain of the MOSFET is coupled to the positive terminal of the capacitor C1 of the voltage booster 13, and a source of the MOSFET is coupled to first ends of the solenoid coils L2, L3 of the fuel injectors 42, 43. Therefore, when the MOSFET of the second discharge unit 18 is turned on and off in accordance with the second drive signal, the positive terminal of the capacitor C1 is electrically connected to and disconnected from the first ends of the solenoid coils L2, L3 accordingly.

The first constant current source 19 has a MOSFET (not shown) that is turned on and off in accordance with the third drive signal received from the injector controller 16. A drain of the MOSFET is coupled to the positive terminal VB of the vehicle battery, and a source of the MOSFET is coupled to the first ends of the solenoid coils L1, L4 of the fuel injectors 41, 44. Therefore, when the MOSFET of the first constant current source 19 is turned on and off in accordance with the third drive signal, the positive terminal VB of the vehicle battery is electrically connected to and disconnected from the first ends of the solenoid coils L1, L4 accordingly.

The second constant current source 20 has a MOSFET (not shown) that is turned on and off in accordance with the fourth drive signal received from the injector controller 16. A drain of the MOSFET is coupled to the positive terminal VB of the vehicle battery, and a source of the MOSFET is coupled to the first ends of the solenoid coils L2, L3 of the fuel injectors 42, 43. Therefore, when the MOSFET of the second constant current source 20 is turned on and off in accordance with the fourth drive signal, the positive terminal VB of the vehicle battery is electrically connected to and disconnected from the first ends of the solenoid coils L2, L3 accordingly.

The first cylinder driver 21 has a MOSFET (not shown) that is turned on and off in accordance with the fifth drive signal received from the injector controller 16. A drain of the MOSFET is coupled to a second end of the solenoid coil L1 of the fuel injector 41, and a source of the MOSFET is coupled to the negative terminal of the vehicle battery. Therefore, when the MOSFET of the first cylinder driver 21 is turned on and off in accordance with the fifth drive signal, the second end of the solenoid coil L1 is electrically connected to and disconnected from the negative terminal of the vehicle battery accordingly.

The second cylinder driver 22 has a MOSFET (not shown) that is turned on and off in accordance with the sixth drive signal received from the injector controller 16. A drain of the MOSFET is coupled to a second end of the solenoid coil L2 of the fuel injector 42, and a source of the MOSFET is coupled to the negative terminal of the vehicle battery. Therefore, when the MOSFET of the second cylinder driver 22 is turned on and off in accordance with the sixth drive signal, the second end of the solenoid coil L2 is electrically connected to and disconnected from the negative terminal of the vehicle battery accordingly.

The third cylinder driver 23 has a MOSFET (not shown) that is turned on and off in accordance with the seventh drive signal received from the injector controller 16. A drain of the MOSFET is coupled to a second end of the solenoid coil L3 of the fuel injector 43, and a source of the MOSFET is coupled to the negative terminal of the vehicle battery. Therefore, when the MOSFET of the third cylinder driver 23 is turned on and off in accordance with the seventh drive signal, the second end of the solenoid coil L3 is electrically connected to and disconnected from the negative terminal of the vehicle battery accordingly.

The fourth cylinder driver 24 has a MOSFET (not shown) that is turned on and off in accordance with the eighth drive signal received from the injector controller 16. A drain of the MOSFET is coupled to a second end of the solenoid coil L4 of the fuel injector 44, and a source of the MOSFET is coupled to the negative terminal of the vehicle battery. Therefore, when the MOSFET of the fourth cylinder driver 24 is turned on and off in accordance with the eighth drive signal, the second end of the solenoid coil L4 is electrically connected to and disconnected from the negative terminal of the vehicle battery accordingly.

The communication I/F 25 transmits and receives the setting data to and from the microcomputer 12. The communication I/F 25 outputs the received setting data to the booster controller 26. The booster controller 26 is described in detail later.

In summary, in the driver unit 14, one of the MOSFETs of the first and second discharge units 17, 18, one of the MOSFETs of the first and second constant current sources 19, 20, and one of the MOSFETs of the first to fourth cylinder drivers 21-24 are turned on, when one of the injection signals #1INJ-#4INJ changes from low to high. Thus, the high voltage is outputted to one of the solenoid coils L1-L4 so that a large peak current flows through the one of the solenoid coils L1-L4. As a result, a corresponding fuel injector is rapidly opened. Then, after a predetermined time period has elapsed, the one of the MOSFETs of the first and second discharge units 17, 18 is turned off so that the output of the high voltage is stopped. Consequently, only the voltage of the vehicle battery is outputted to the solenoid coil of the corresponding fuel injector, which is opened. Therefore, a constant current smaller than the peak current flows through the solenoid coil so that the corresponding fuel injector can remain opened.

The rectifier unit 15 includes diodes D2-D9. The diode D2 has an anode coupled to the source of the MOSFET of the first constant current source 19 and a cathode coupled to the first ends of the solenoid coils L1, L4 of the fuel injectors 41, 44. The diode D3 has an anode coupled to the source of the MOSFET of the second constant current source 20 and a cathode coupled to the first ends of the solenoid coils L2, L3 of the fuel injectors 42, 43. The diode D4 has an anode coupled to the negative terminal of the vehicle battery and a cathode coupled to the first ends of the solenoid coils L1, L4 of the fuel injectors 41, 44. The diode D5 has an anode coupled to the negative terminal of the vehicle battery and a cathode coupled to the first ends of the solenoid coils L2, L3 of the fuel injectors 42, 43. The diode D6 has a cathode coupled to the positive terminal of the capacitor C1 of the voltage booster 13 and an anode coupled to the second end of the solenoid coil L1 of the fuel injector 41. The diode D7 has a cathode coupled to the positive terminal of the capacitor C1 of the voltage booster 13 and an anode coupled to the second end of the solenoid coil L4 of the fuel injector 44. The diode D8 has a cathode coupled to the positive terminal of the capacitor C1 of the voltage booster 13 and an anode coupled to the second end of the solenoid coil L3 of the fuel injector 43. The diode D9 has a cathode coupled to the positive terminal of the capacitor C1 of the voltage booster 13 and an anode coupled to the second end of the solenoid coil L2 of the fuel injector 42.

In the rectifier unit 15, when the high voltage is outputted from the first and second discharge units 17, 18', counter electromotive force is produced in the solenoid coils L1-L4 in a direction to prevent an increase in an electric current flowing the solenoid coils L1-L4. As a result, an electric current flows from the negative terminal of the vehicle battery to the solenoid coils L1-L4 via the diodes D4, D5. Thus, the counter electromotive force is limited.

In the rectifier unit 15, when an electric current flowing from the driver unit 14 to the solenoid coils L1-L4 is reduced or interrupted, counter electromotive force is produced in the solenoid coils L1-L4 in a direction to prevent a reduction in an electric current flowing through the solenoid coils L1-L4. As a result, the counter electromotive force is regenerated to the capacitor C1 via the diodes D6-D9. Thus, the counter electromotive force is limited.

In the rectifier unit 15, when the high voltage is outputted from the first and second discharge units 17, 18, the diodes D2, D3 protect the MOSFETs of the first and second constant current sources 19, 20 from the high voltage. In contrast, when the output of the high voltage from the first and second discharge units 17, 18 is stopped, the vehicle battery voltage outputted from the first and second constant current sources 19, 20 is applied to the solenoids coils L1-L4 via the diodes D2, D3.

Figure 2:
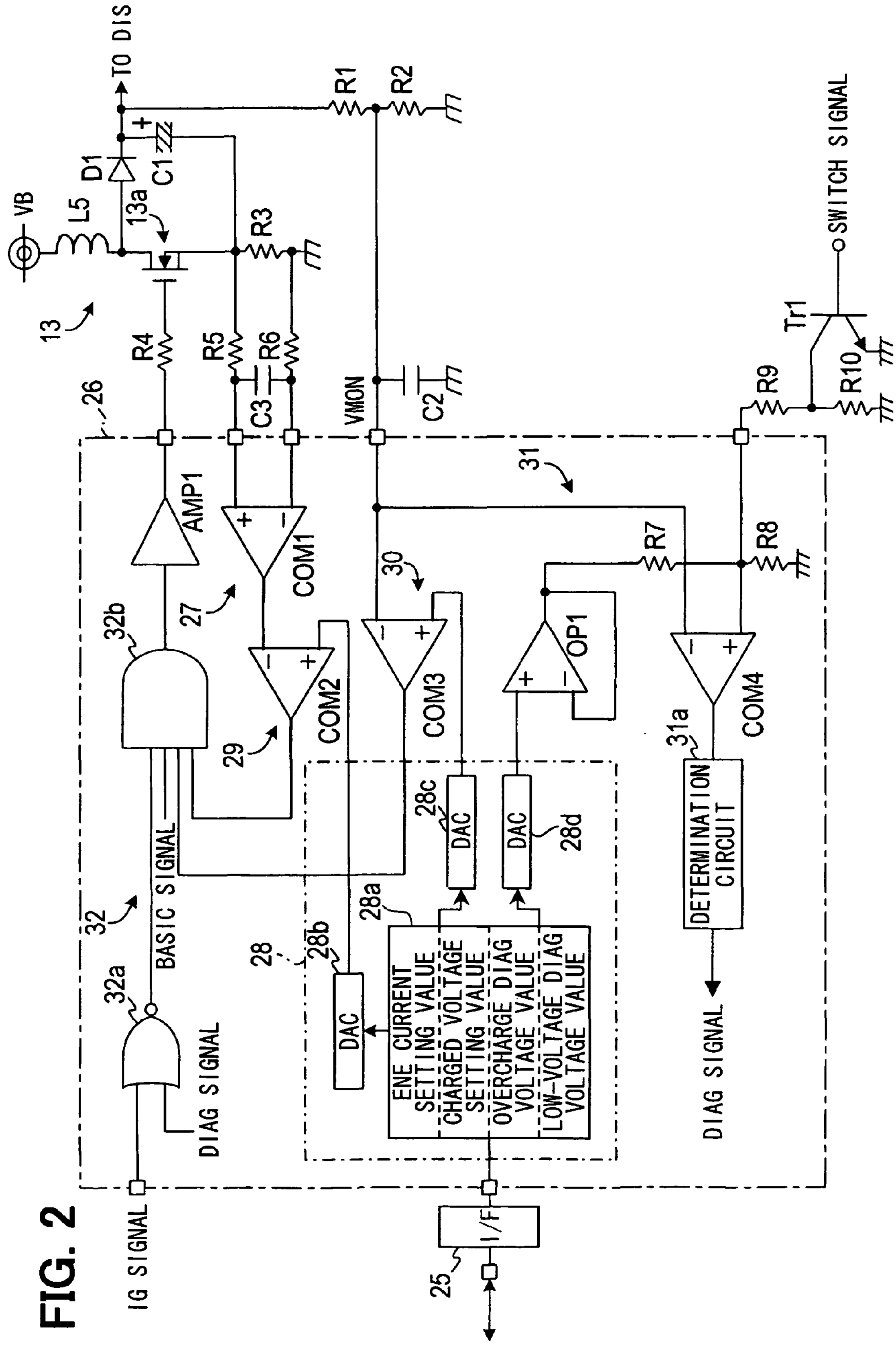
FIG. 2 is a circuit diagram illustrating a booster controller in the engine electronic control unit of FIG. 1.

As shown in detail in FIG. 2, the booster controller 26 includes an energization current measurement unit 27, a data memory unit 28, an energization current comparison unit 29, a charged voltage comparison unit 30, a fault diagnosis unit 31, and a switch unit 32.

The energization current measurement unit 27 includes a comparator COM1. The comparator COM1 has a non-inverting input terminal coupled to the second end of the resistor R5 of the voltage booster 13 and an inverting input terminal coupled to the second end of the resistor R6 of the voltage booster 13. Therefore, the comparator COM1 amplifies a voltage across the resistor R3 of the voltage booster 13 and outputs the amplified voltage.

The data memory unit 28 includes a register 28*a* and digital-to-analog (D/A) converters 28*b*-28*d*. The register 28*a* is a nonvolatile rewritable memory device. The setting data outputted from the communication I/F 25 is written into the register 28*a*. The setting data includes an energization current setting value, a charged voltage setting value, an overcharge diagnosis voltage value, and a low-voltage diagnosis voltage value.

Specifically, the energization current setting value is a digital value representing a voltage to which the comparator COM1 amplifies a voltage that appears across the resistor R3 of the voltage booster 13 when an electric current having a target current value flows through the coil L5 of the voltage booster 13. In the first embodiment, the energization current setting value has a minimum value Imin and a maximum value Imax. Both the minimum energization current setting value Imin and the maximum energization current setting value Imax are rewritten into the register 28*a*.

The charged voltage setting value is a digital value representing a voltage that appears across the resistor R2 of the voltage booster 13 when the charged voltage of the capacitor C1 reaches the high voltage. The overcharge diagnosis voltage value is a digital value representing a voltage that appears across the resistor R2 when the capacitor C1 is overcharged. The low-voltage diagnosis voltage value is a digital value representing a voltage that appears across the resistor R2 when the charged voltage of the capacitor C1 decreases to a significant low level due to a failure such as leak current or short-circuit occurring in the voltage booster 13.

The D/A converter 28*b* alternately outputs an analog signal corresponding to the minimum energization current setting value Imin and an analog signal corresponding to the maximum energization current setting value Imax. The D/A converter 28*c* outputs a voltage corresponding to the charged voltage setting value. The D/A converter 28*d* alternately outputs an analog signal corresponding to the overcharge diagnosis voltage value and an analog signal corresponding to the low-voltage diagnosis voltage value.

Thus, in the data memory unit 28, the register 28*a* stores the setting data outputted from the microcomputer 12, and the D/A converters 28*b*-28*d* converts the setting data stored in the register 28*a* to the analog signals.

The energization current comparison unit 29 includes a comparator COM2. The comparator COM2 has a non-inverting input terminal for receiving the analog signal (i.e., the energization current setting value) outputted from the D/A converter 28*b* of the data memory unit 28 and an inverting input terminal for receiving the output voltage of the comparator COM1 of the energization current measurement unit 27. Thus, when the voltage across the resistor R3 is less than the energization current setting value, an output voltage level of the comparator COM2 becomes high. In contrast, when the voltage across the resistor R3 reaches the energization current setting value, the output voltage level of the comparator COM2 becomes low.

The charged voltage comparison unit 30 includes a comparator COM3. The comparator COM3 has a non-inverting input terminal for receiving the analog signal (i.e., the charged voltage setting value) outputted from the D/A converter 28*c* of the data memory unit 28 and an inverting input terminal for receiving the monitor voltage VMON. Thus, when the monitor voltage VMON is less than the charged voltage setting value, an output voltage level of the comparator COM3 becomes high. In contrast, when the monitor voltage VMON reaches the charged voltage setting value, the output voltage level of the comparator COM3 becomes low.

The fault diagnosis unit 31 includes an operational amplifier (op-amp) OP1, a comparator COM4, a determination circuit 31*a*, resistors R7-R10, and a transistor Tr1. The op-amp OP1 has a non-inverting input terminal for receiving the analog signal (i.e., the overcharge diagnosis voltage value or the low-voltage diagnosis voltage value) outputted from the D/A converter 28*d* of the data memory unit 28 and an inverting input terminal for receiving an output voltage of the op-amp OP1. That is, an output terminal and the inverting input terminal of the op-amp OP1 are coupled together. Thus, the op-amp OP1 serves as a voltage follower and outputs the same analog signal as the D/A converter 28*d* outputs.

In a voltage follower constructed with an op-amp, an output voltage may become greater than an input voltage due to characteristics of the op-amp. In the first embodiment, to prevent this problem, the output voltage of the op-amp OP1 is divided among the resistors R7-R10. Specifically, the output terminal of the op-amp OP1 is coupled to the negative terminal of the vehicle battery via the resistors R7, R8 that are connected in series. A first end of the resistor R9, which is located outside the booster controller 26, is coupled to a node between the resistors R7, R8. A second end of the resistor R9 is coupled to the negative terminal of the vehicle battery via the resistor R10, which is located outside the booster controller 26. Resistances of the resistors R8-R10 are adjusted so that a voltage across the resistor R8 can be approximately equal to the voltage of the analog signal outputted from the D/A converter 28*d*.

The comparator COM4 has a non-inverting input terminal for receiving the voltage (i.e., the overcharge diagnosis voltage value or the low-voltage diagnosis voltage value) across the resistor R8 and an inverting input terminal for receiving the monitor voltage VMON.

The determination circuit 31*a* starts counting, when an output voltage level of the comparator COM4 changes from high to low. Then, when the counting value reaches a threshold value, i.e., when a threshold time has elapsed since the start of the counting, an output voltage level of the determination circuit 31*a* becomes high. The threshold time is a time period required for the charged voltage of the capacitor C1 to reach the low-voltage diagnosis voltage value after the start of the charging of the capacitor C1. The output voltage of the determination circuit 31*a* is used as a fault diagnosis signal that indicates whether a failure such as leak current or short-circuit occurs in the voltage booster 13.

The transistor Tr1 is an NPN-type bipolar transistor and located outside the booster controller 26. The transistor Tr1 has a base for receiving the diagnosis voltage switch signal from the microcomputer 12, a collector coupled to a node between the resistors R9, R10, and an emitter coupled to the negative terminal of the vehicle battery.

Therefore, in the fault diagnosis unit 31, when the voltage level of the diagnosis voltage switch signal is low, the transistor Tr1 is turned off. As a result, the analog signal (i.e., the overcharge diagnosis voltage value or the low-voltage diagnosis voltage value) outputted from the D/A converter 28*d* of the data memory unit 28 is applied to the non-inverting input terminal of the comparator COM4. In contrast, when the voltage level of the diagnosis voltage switch signal is high, the transistor Tr1 is turned on. As a result, a voltage divisional ratio, by which the output voltage of the op-amp OP1 is divided, changes so that the voltage (i.e., the overcharge diagnosis voltage value or the low-voltage diagnosis voltage value) across the resistor R8 is reduced. The reduced voltage is applied to the non-inverting input terminal of the comparator COM4.

Further, in the fault diagnosis unit 31, the comparator COM4 compares the voltage across the resistor R8 with the monitor voltage VMON. The fault diagnosis signal outputted from the determination circuit 31*a* becomes high, when the threshold time has elapsed under a condition where the monitor voltage VMON remains equal to or greater than the overcharge diagnosis voltage value, or when the threshold time has elapsed under a condition where the monitor voltage VMON remains less than the low-voltage diagnosis voltage value.

The switch unit 32 includes a NOR gate 32*a*, a AND gate 32*b*, and an amplifier AMP1. The NOR gate 32*a* has two input terminals. Specifically, the NOR gate 32*a* has a first input terminal for receiving an ignition (IG) signal and a second input terminal for receiving the fault diagnosis signal. The IG signal indicates whether electric power is supplied to an ignition system (not shown) of the engine. In the first embodiment, the IG signal is a binary signal. When the electric power is not supplied to the ignition system, a voltage level of the IG signal is set to high. In contrast, when the electric power is supplied to the ignition system, the voltage level of the IG signal is set to low.

The NOR gate 32*a* is activated so that an output voltage level of the NOR gate 32*a* becomes low, when at least one of the IG signal and the fault diagnosis signal is high.

The AND gate 32*b* has four input terminals. Specifically, the AND gate 32*b* has a first input terminal for receiving the output voltage of the NOR gate 32*a*, a second input terminal for receiving a basic operation signal, a third input terminal for receiving the output voltage of the comparator COM3 of the charged voltage comparison unit 30, and a fourth input terminal for receiving the output voltage of the comparator COM2 of the energization current comparison unit 29. In the first embodiment, the basic operation signal is a binary signal and outputted from the microcomputer 12 or the injector controller 16. When all the solenoid coils L1-L4 of the fuel injectors 41-44 are deenergized, a voltage level of the basic operation signal is set to high. In contrast, when at least one of the solenoid coils L1-L4 is energized, the voltage level of the basic operation signal is set to low.

The AND gate 32*b* is activated so that an output voltage level of the AND gate 32*b* becomes high, when the output voltage of the NOR gate 32*a* is high, the basic operation signal is high, the output voltage of the comparator COM3 is high, and the output voltage of the comparator COM2 is high.

The amplifier AMP1 is a totem-pole buffer circuit and has an input terminal for receiving the output voltage of the AND gate 32*b*. When the output voltage of the AND gate 32*b* is high, an output voltage of the amplifier AMP1 becomes high. In contrast, when the output voltage of the AND gate 32*b* is low, the output voltage of the amplifier AMP1 becomes low. An output terminal of the amplifier AMP1 is coupled to the gate of the MOSFET 13*a* of the voltage booster 13 via the resistor R4 of the voltage booster 13.

Therefore, in the switch unit 32, the output voltage of the amplifier AMP1 becomes high, only when the electric power is supplied to the ignition system of the engine, all the solenoid coils L1-L4 of the fuel injectors 41-44 are denenergized, the electric current flowing through the coil L5 of the voltage booster 13 is less than the target current value, the charged voltage of the capacitor C1 is less than the high voltage, the capacitor C1 is not overcharged, and the charged voltage of the capacitor C1 is greater than the significant low level. When the output voltage of the amplifier AMP1 becomes high, the MOSFET 13*a* of the voltage booster 13 is turned on.

In contrast, the output voltage of the amplifier AMP1 becomes low, when the electric power is not supplied to the ignition system of the engine, at least one of the solenoid coils L1-L4 of the fuel injectors 41-44 is energized, the electric current flowing through the coil L5 of the voltage booster 13 reaches the target current value, the charged voltage of the capacitor C1 reaches the high voltage, the capacitor C1 is overcharged, or the charged voltage of the capacitor C1 decreases to the significant low level. When the output voltage of the amplifier AMP1 becomes low, the MOSFET 13*a* of the voltage booster 13 is turned off.

Figure 3:
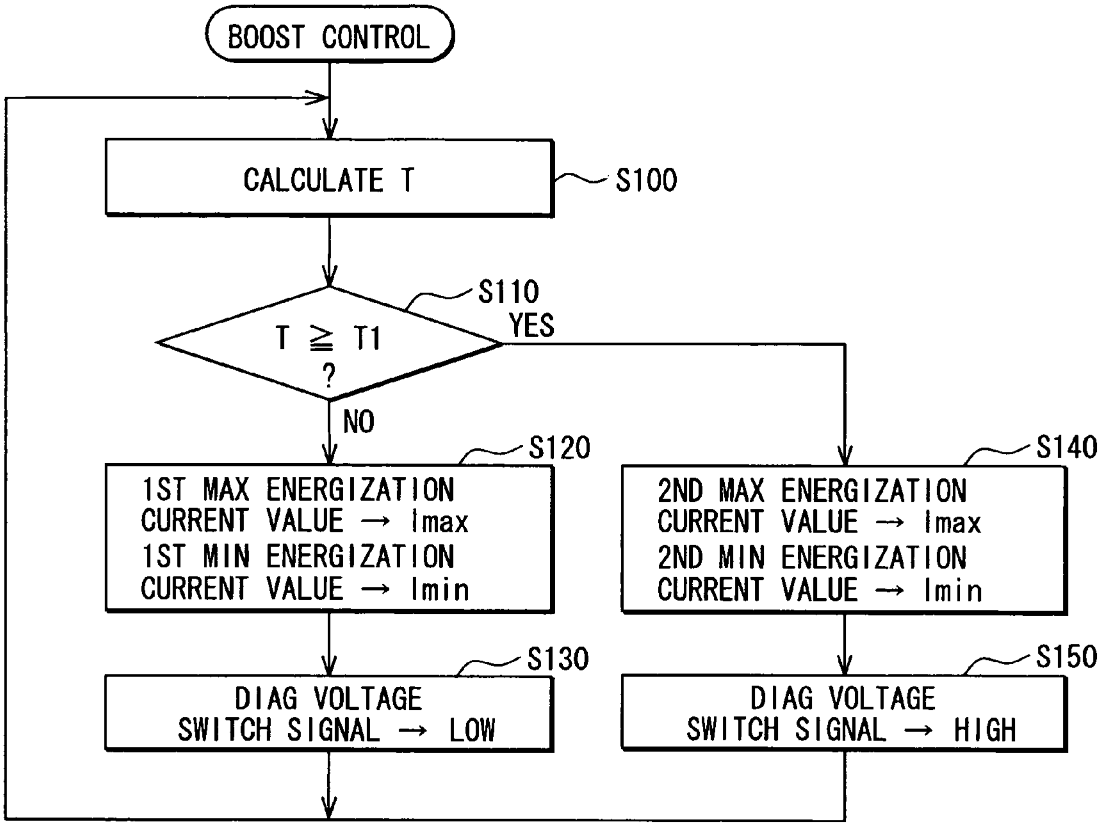
FIG. 3 is a flow diagram illustrating a boost control process executed by a microprocessor in the engine electronic control unit of FIG. 1.

The microcomputer 12 executes a voltage boost control process illustrated in a flow diagram of FIG. 3. The boost control process is repeatedly executed after the microcomputer 12 is booted up.

As shown in FIG. 3, the boost control process starts at step S100, where the microcomputer 12 calculates a drive interval T based on at least one of the engine speed signal, the pedal operation amount signal, the throttle opening signal, and the intake air flow rate signal. The drive interval T is an interval at which the fuel injectors 41-44 are driven (i.e., opened).

Then, the boost control process proceeds to step S110, where the microcomputer 12 determines whether the calculated drive interval T is equal to or greater than a predetermined time period T1. In the first embodiment, the time period T1 is set as a time period required for the charged voltage of the capacitor C1 to reach the high voltage when an electric current smaller than a maximum allowable current flows through the coil L5, the MOSFET 13*a*, and the resistor R3. The maximum allowable current is hereinafter called a "first energization current". The electric current small than the maximum allowable current is hereinafter called a "second energization current".

If the drive interval T is less than the time period T1 corresponding to NO at step S110, the boost control process proceeds to step S120. At step S120, the microcomputer 12 outputs a first maximum energization current value as the maximum energization current setting value Imax to the driver unit 14. Also, the microcomputer 12 outputs a first minimum energization current value as the minimum energization current setting value Imin to the driver unit 14. The first maximum energization current value is a digital value representing a maximum value of a voltage to which the comparator COM1 amplifies a voltage that appears across the resistor R3 when the first energization current flows through the coil L5. The first minimum energization current value is a digital value representing a minimum value of the voltage to which the comparator COM1 amplifies the voltage that appears across the resistor R3 when the first energization current flows through the coil L5.

Then, the boost control process proceeds to step S130, where the microcomputer 12 sets the voltage level of the diagnosis voltage switch signal to low. Then, the boost control process returns to step S100.

In contrast, if the drive interval T is equal to or greater than the time period T1 corresponding to YES at step S110, the boost control process proceeds to step S140. At step S140, the microcomputer 12 outputs a second maximum energization current value as the maximum energization current setting value Imax to the driver unit 14. Also, the microcomputer 12 outputs a second minimum energization current value as the minimum energization current setting value Imin to the driver unit 14. The second maximum energization current value is a digital value representing a maximum value of a voltage to which the comparator COM1 amplifies a voltage that appears across the resistor R3 when the second energization current flows through the coil L5. The second minimum energization current value is a digital value representing a minimum value of the voltage to which the comparator COM1 amplifies the voltage that appears across the resistor R3 when the second energization current flows through the coil L5.

Then, the boost control process proceeds to step S150, where the microcomputer 12 sets the voltage level of the diagnosis voltage switch signal to high. Then, the boost control process returns to step S100.

Figure 4A:
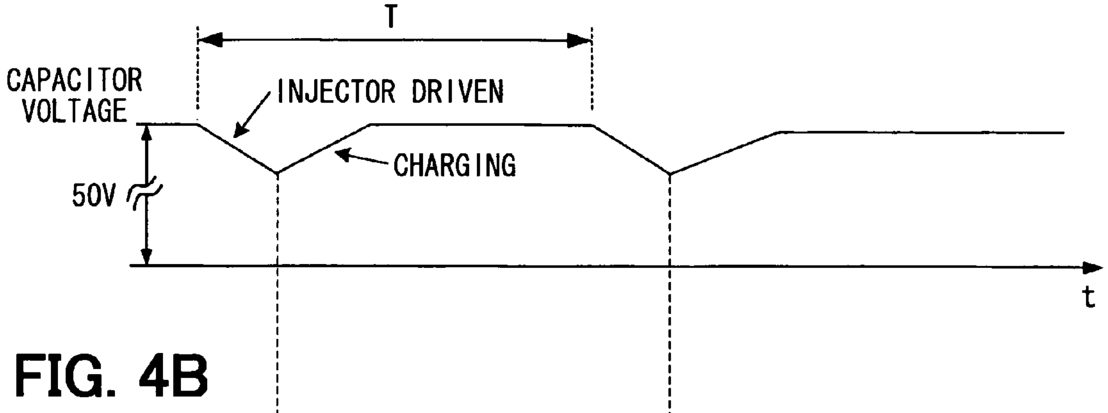
FIG. 4A is a graph showing a change in a charged voltage of a capacitor in a voltage booster in the engine electronic control unit of FIG. 1 when an engine of a vehicle runs at high speed.

In summary, when the vehicle is accelerated or runs at constant high speed, the engine speed of the vehicle becomes high so that the drive interval T becomes short, as shown in FIG. 4A.

Figure 4B:
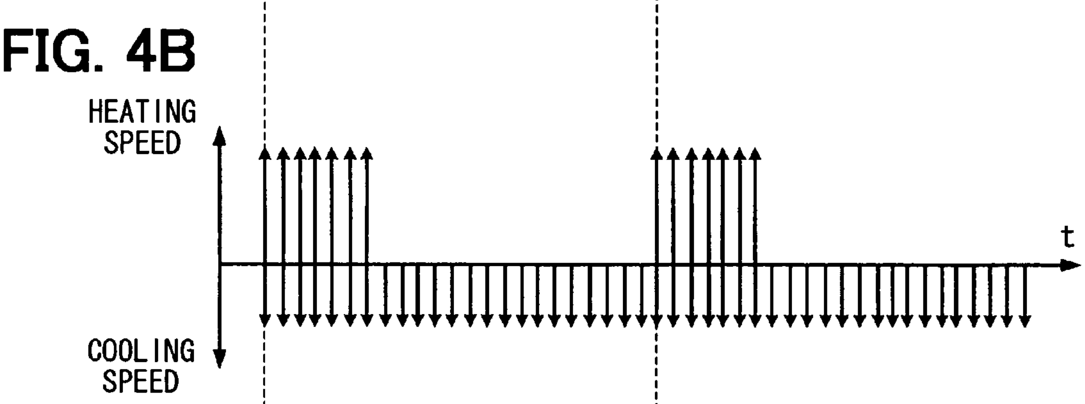
FIG. 4B is a graph showing a relationship between a heat generation speed and a heat dissipation speed of the voltage booster when the engine runs at high speed, and FIG.

In this case, the microcomputer 12 causes the first energization current to intermittently flow through the coil L5 of the voltage booster 13, until the charged voltage of the capacitor C1 reaches the high voltage. Therefore, the charged voltage of the capacitor C1 rapidly reaches the high voltage. In the case of FIG. 4A, as shown in FIG. 4B, although the voltage booster

Figure 4C:
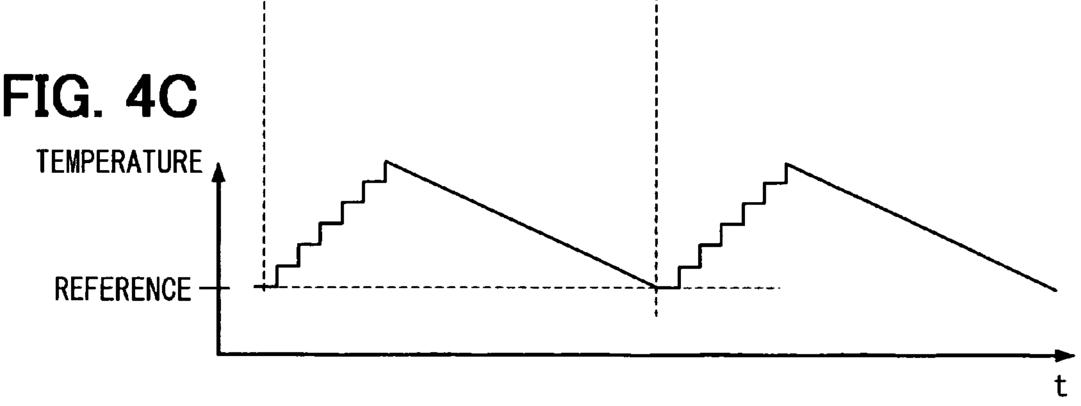

13 generates a large amount of heat, the generated heat is rapidly dissipated by a large amount of air flow caused by the high speed running of the vehicle. As a result, as shown in FIG. 4C, the voltage booster 13 is cooled down to a reference level within the drive interval T.

In contrast, when the vehicle is deaccelerated or runs at constant low speed, the engine speed of the vehicle becomes low so that the drive interval T becomes long, as shown in FIG. 5A. In this case, the microcomputer 12 causes the second energization current to intermittently flow through the coil L5 of the voltage booster 13, until the charged voltage of the capacitor C1 reaches the high voltage. Therefore, the charged voltage of the capacitor C1 gradually reaches the high voltage. In the case of FIG. 5A, as shown in FIG. 5B, the voltage booster 13 generates a small amount of heat. Therefore, as shown in FIG. 5B, the generated heat can be dissipated by a small amount of air flow caused by the low speed running of the vehicle. As a result, as shown in FIG. 5C, the voltage booster 13 is cooled down to the reference level within the drive interval T.

Thus, in the engine ECU 1, the heat resulting from the voltage boost operation performed by the voltage booster 13 is suitably dissipated so that the electronic devices located near the voltage booster 13 can be protected from the heat. Further, since the microcomputer 12 calculates the drive interval T, it can be accurately determined whether the drive interval T exceeds the time period T1.

Further, in the engine ECU 1, when the voltage level of the diagnosis voltage switch signal is set to high, the charged voltage of the capacitor C1 is boosted to the high voltage by the second energization current smaller than the first energization current. As mentioned previously, when the diagnosis voltage switch signal is high, the low-voltage diagnosis voltage value is reduced. Therefore, even when it takes a long time for the charged voltage of the capacitor C1 to reach the high voltage, it can be prevented that the determination circuit 31*a* incorrectly determines that the failure such as leak current or short-circuit occurs in the voltage booster 13.

Furthermore, in the engine ECU 1, when the engine stops (i.e., the vehicle is parked), the voltage level of the IG signal is set to high so that the MOSFET 13*a* of the voltage booster 13 is turned off. That is, when it is difficult to generate air flow enough to suitably cool the voltage booster 13 due to the fact that the vehicle is parked, the current flow to the coil L5 is interrupted. In such an approach, when it is difficult to generate air flow enough to suitably cool the voltage booster 13, the voltage booster operation, which generates heat, is not performed. In such an approach, the electronic devices located near the voltage booster 13 can be protected from the heat.

In addition, the switch unit 32 for turning on and off the MOSFET 13*a* is constructed with logic circuits. Therefore, the electronic devices can be protected from the heat without placing high processing load on the microcomputer 12.

Steps S110, S120, and S140 of the voltage boost control process executed by the microcomputer 12 can serve as a current value set means of a claimed invention. The energization current measurement unit 27 and the resistor R3 can serve as a current value measurement means of the claimed invention. The data memory unit 28, the energization current comparison unit 29, and the switch unit 32 can serve as a switch means of the claimed invention. The voltage booster 13 can serve as an output voltage generating means of the claimed invention. The resistor R2 can serve as a voltage value measurement means of the claimed invention. The data memory unit 28, the charged voltage comparison unit 30, and the AND gate 32*b* can serve as a switch control means of the claimed invention. Step S100 of the voltage boost control process executed by the microcomputer 12 can serve as a drive interval calculating means of the claimed invention. The data memory unit 28, the op-amp OP1, the resistors R7-R10, the comparator COM4, and the determination circuit 31*a* can serve as an abnormal signal output means of the claimed invention. Steps S130, S150 of the voltage boost control process and the transistor Tr1 can serve as a diagnosis voltage switch means. The switch unit 32 can serve as a control means of the claimed invention.

The first embodiment described above can be modified in various ways. For example, in the following way, the microcomputer 12 can determine whether the drive interval T is equal to or greater than the time period T1 without calculating the drive interval T.

At step S100, the microcomputer 12 performs at least one of the following measurement tasks.

1.) The microcomputer 12 measures the number of revolutions per unit time of the engine based on the engine speed signal.

2.) The microcomputer 12 measures the amount of operation of the acceleration pedal of the vehicle based on the pedal operation amount signal.

3.) The microcomputer 12 measures the degree of opening of the throttle of the engine based on the throttle opening signal.

4.) The microcomputer 12 measures the amount of intake air supplied to the engine of the vehicle based on the intake air flow rate signal.

5.) The microcomputer 12 measures the temperature of the engine coolant based on the engine coolant temperature signal.

6.) The microcomputer 12 measures the temperature of the engine oil based on the oil temperature signal.

7.) The microcomputer 12 measures the temperature of the exhaust gas discharged from the engine based on the exhaust gas temperature signal.

Then, at step S110, the microcomputer 12 performs at least one of the following determination tasks. If at least one of results of the performed determination tasks is true, the microcomputer 12 can determine that the drive interval T is equal to or greater than the time period T1.

1.) The microcomputer 12 determines whether the measured number of engine revolutions is equal to or less than the number of engine revolutions that appears when the drive interval T is equal to the time period T1.

2.) The microcomputer 12 determines whether the measured amount of acceleration pedal operation is equal to or less than the amount of acceleration pedal operation that appears when the drive interval T is equal to the time period T1.

3.) The microcomputer 12 determines whether the measured degree of engine throttle opening is equal to or less than the degree of engine throttle opening that appears when the drive interval T is equal to the time period T1.

4.) The microcomputer 12 determines whether the measured amount of supplied intake air is equal to or less than the amount of supplied intake air that appears when the drive interval T is equal to the time period T1.

5.) The microcomputer 12 determines whether the measured engine coolant temperature is equal to or less than an engine coolant temperature that appears when the drive interval T is equal to the time period T1.

6.) The microcomputer 12 determines whether the measured engine oil temperature is equal to or less than an engine oil temperature that appears when the drive interval T is equal to the time period T1.

7.) The microcomputer 12 determines whether the measured exhaust gas temperature is equal to or less than an exhaust gas temperature that appears when the drive interval T is equal to the time period T1.

In the above case, step S100 of the voltage boost control process executed by the microcomputer 12 can serve as a revolution speed measurement means, an operation amount measurement means, an opening degree measurement means, an air flow rate measurement means, a coolant temperature measurement means, a lubricant temperature measurement means, and an exhaust gas temperature measurement means.

For another example, in the following way, the microcomputer 12 can determine whether the drive interval T is equal to or greater than the time period T1 without calculating the drive interval T.

At step S100, the microcomputer 12 performs at least one of the following measurement tasks.

1.) The microcomputer 12 measures the running speed of the vehicle based on the vehicle speed signal.

2.) The microcomputer 12 measures the internal temperature based on the internal temperature signal.

3.) The microcomputer 12 measures the outside air temperature based on the outside air temperature signal.

4.) The microcomputer 12 measures the temperature of intake air supplied to the engine based on the intake air temperature signal.

Then, at step S110, the microcomputer 12 performs at least one of the following determination tasks. If at least one of results of the performed determination tasks is true, the microcomputer 12 can proceed to step S140.

1.) The microcomputer 12 determines whether the vehicle running speed is equal to or less than a minimum speed that can cause air flow enough to cool the voltage booster 13.

2.) The microcomputer 12 determines whether the gear of the vehicle is in the parking position or in the neutral position based on the parking signal or the neutral signal.

3.) The microcomputer 12 determines whether the internal temperature inside the engine ECU 1 is equal to or greater than a temperature that can affect operations of the electronic devices located near the voltage booster 13.

4.) The microcomputer 12 determines whether the outside air temperature is equal to or greater than a temperature that can affect operations of the electronic devices located near the voltage booster 13.

5.) The microcomputer 12 determines whether the intake air temperature is equal to or greater than a temperature that can affect operations of the electronic devices located near the voltage booster 13.

In the above case, step S100 of the voltage boost control process executed by the microcomputer 12 can serve as a running speed measurement means, an ambient temperature measurement means, an outside air temperature measurement means, and an intake air temperature measurement means of the claimed invention. And, step S110 of the voltage boost control process can serves as an operational status detecting means.

(Second Embodiment)

A second embodiment of the present invention is described below with reference to FIG. 6. Differences between the first and second embodiments are as follows.

In the second embodiment, the IG signal is inputted to the booster controller 26 through the microcomputer 12. The microcomputer 12 executes an engine control process illustrated in a flow diagram of FIG. 6. The engine control process is repeatedly executed after the microcomputer 12 is booted up.

As shown in FIG. 6, the engine control process starts at step S200, where the microcomputer 12 determines whether the voltage level of the IG signal inputted to the microcomputer 12 is set to low. If the voltage level of the IG signal is low corresponding to YES at step S200, the engine control process proceeds to step S210. At step S210, the microcomputer 12 keeps the voltage level of the IG signal low. Then, the engine control process proceeds to step S220, where the microcomputer 12 executes the boost control process illustrated in FIG. 3. After the boost control process is executed, the engine control process returns to step S200.

In contrast, if the voltage level of the IG signal is high corresponding to NO at step S200, the engine control process proceeds to step S230. At step S230, the microcomputer 12 determines, based on the engine speed signal, whether the engine of the vehicle is stopped.

If the engine still runs corresponding to NO at step S230, the engine control process proceeds to step S210. At step S210, the microcomputer 12 changes the voltage level of the IG signal from high to low. In contrast, if the engine is stopped corresponding to YES at step S230, the engine control process proceeds to step S240. At step 240, the microcomputer 12 keeps the voltage level of the IG signal high. Then, the engine control process returns to step S200.

In summary, the engine ECU 1 according to the second embodiment can be suitably used for a vehicle that is configured such that an engine of the vehicle continues to run for a certain period of time after the IG signal changes from low to high.

(Modifications)

The embodiments described above may be modified in various ways.

The engine ECU 1 can be configured to control fuel injectors for an engine other than a four-cylinder direct-injection gasoline engine. For example, the engine ECU 1 can be configured to control fuel injectors for a gasoline engine having less than or more than four cylinders. Further, the engine ECU 1 can be configured to control fuel injectors for a diesel engine.

In the embodiments, the voltage booster 13 generates a voltage used for a fuel injector of a vehicle. Alternatively, the voltage booster 13 can generate a voltage that is used for apparatus other than a fuel injector.

The voltage booster 13 has one coil (i.e., coil L5). Alternatively, the voltage booster 13 can have multiple coils, which are coupled in series or in parallel.

The voltage booster 13 has one capacitor (i.e., capacitor C1). Alternatively, the voltage booster 13 can have multiple capacitors, which are coupled in series or in parallel.

Both the maximum energization current setting value Imax and the minimum energization current setting value Imin are written into the register 28*a*. Alternatively, one of the maximum energization current setting value Imax and the minimum energization current setting value Imin can be written into the register 28*a*. Alternatively, an average value of the maximum energization current setting value Imax and the minimum energization current setting value Imin can be written into the register 28*a*.

The analog signal corresponding to the energization current setting value is generated by D/A converting the energization current setting value stored in the register 28*a*. Alternatively, the analog signal corresponding to the energization current setting value can be generated by other methods. For example, the analog signal corresponding to the energization current setting value can be generated by dividing the high voltage, the battery voltage, or a voltage of an additional DC power source incorporated in the engine ECU 1.

The microcomputer 12 reduces the overcharge diagnosis voltage value and the low-voltage diagnosis voltage value by turning on the transistor Tr1. Alternatively, the microcomputer 12 can reduce the overcharge diagnosis voltage value and the low-voltage diagnosis voltage value by rewriting a reduced overcharge diagnosis voltage value and a reduced low-voltage diagnosis voltage value into the register 28*a*.

Such changes and modifications are to be understood as being within the scope of the present invention as defined by the appended claims.

What is claimed is:

1. A voltage generator mountable on a vehicle comprising:

a coil configured such that an energization current having a target current value flows through the coil;

a resistor coupled to the coil;

a current value set means for determining, based on an operating condition of the vehicle, whether a predetermined set condition is true or false, the current value set means setting the target current value of the energization current to a first current value when the set condition is false, the current value set means setting the target current value of the energization current to a second current value less than the first current value when the set condition is true;

a current value measurement means for measuring an actual current value of the energization current flowing through the coil, based on an amplified voltage across the resistor;

a switch means for determining whether the actual current value measured by the current value measurement means is less than the target current value set by the current value set means, the switch means allowing the energization current to flow through the coil when the measured actual current value is less than the set target current value, the switch means preventing the energization current from flowing through the coil when the measured actual current value is equal to or greater than the set target current value;

an output voltage generating means having a capacitor and for generating an output voltage by charging the capacitor by counterelectromotive force produced in the coil;

a voltage value measurement means for measuring a voltage value of the output voltage;

a switch control means for determining whether the voltage value measured by the voltage value measurement means is less than a predetermined reference voltage value, the switch control means enabling the switch means when the measured voltage value is less than the reference voltage value, the switch control means disabling the switch means when the measured voltage value is equal to or greater than the reference voltage value, and a switching device coupled between a positive terminal of the capacitor and an injector coil of an internal combustion engine of the vehicle to selectively apply the output voltage to the injector coil;

wherein the set condition includes a drive interval condition, wherein the drive interval condition becomes true when a drive interval at which a fuel injector of the vehicle is driven is equal to or greater than a predetermined time period, wherein the drive interval condition becomes false when the drive interval is less than the predetermined time period, and wherein the drive interval is a time period from when the fuel injector is opened to when the fuel injector is reopened.

2. The voltage generator according to claim 1, wherein the voltage generator is accommodated in a common housing with other electronic apparatus.

3. The voltage generator according to claim 1, further comprising:

a drive interval calculating means for calculating the drive interval, wherein the current value set means determines whether the drive interval condition is true or false based on the calculated drive interval.

4. The voltage generator according to claim 1, further comprising:

a revolution speed measurement means for measuring the number of revolutions per unit time of the internal-combustion engine, wherein the current value set means determines whether the drive interval condition is true or false based on the measured number of revolutions per unit time.

5. The voltage generator according to claim 1, further comprising:

an operation amount measurement means for measuring an amount of operation of an apparatus that controls a throttle of the internal-combustion engine, wherein the current value set means determines whether the drive interval condition is true or false based on the measured amount of operation of the apparatus.

6. The voltage generator according to claim 1, further comprising:

an opening degree measurement means for measuring a degree of opening of a throttle of the internal-combustion engine, wherein the current value set means determines whether the drive interval condition is true or false based on the measured degree of opening of the throttle.

7. The voltage generator according to claim 1, further comprising:

an air flow rate measurement means for measuring an amount of air supplied to the internal-combustion engine, wherein the current value set means determines whether the drive interval condition is true or false based on the measured amount of air.

8. The voltage generator according to claim 1, further comprising:

a coolant temperature measurement means for measuring a temperature of a coolant for cooling the internal-combustion engine, wherein the current value set means determines whether the drive interval condition is true or false based on the measured coolant temperature.

9. The voltage generator according to claim 1, further comprising:

a lubricant temperature measurement means for measuring a temperature of a lubricant for lubricating the internal-combustion engine, wherein the current value set means determines whether the drive interval condition is true or false based on the measured lubricant temperature.

10. The voltage generator according to claim 1, further comprising:

an exhaust gas temperature measurement means for measuring a temperature of exhaust gas discharged from the internal-combustion engine, wherein the current value set means determines whether the drive interval condition is true or false based on the measured exhaust gas temperature.

11. The voltage generator according to claim 1, wherein the set condition includes a running speed condition, wherein the running speed condition becomes true when a running speed of the vehicle is less than a predetermined speed, and wherein the running speed condition becomes false when the running speed is equal to or greater than the predetermined speed.

12. The voltage generator according to claim 11, further comprising:

a running speed measurement means for measuring the running speed of the vehicle, wherein the current value set means determines whether the running speed condition is true or false based on the measured running speed.

13. The voltage generator according to claim 11, further comprising:

an operational status detecting means for detecting an operational status of the vehicle, wherein the current value set means determines whether the running speed condition is true or false based on the detected operational status.

14. The voltage generator according to claim 1, wherein the set condition includes a temperature condition, wherein the temperature condition becomes true when an ambient temperature of the voltage generator is greater than a predetermined temperature, and wherein the temperature condition becomes false when the ambient temperature is less than the predetermined temperature.

15. The voltage generator according to claim 14, further comprising:

an ambient temperature measurement means for measuring the ambient temperature of the voltage generator, wherein the current value set means determines whether the temperature condition is true or false based on the measured ambient temperature.

16. The voltage generator according to claim 14, further comprising:

an outside air temperature measurement means for measuring an outside air temperature outside the vehicle, wherein the current value set means determines whether the temperature condition is true or false based on the measured outside air temperature.

17. The voltage generator according to claim 14, further comprising:

an intake air temperature measurement means for measuring a temperature of intake air supplied to the internal-combustion engine, wherein the current value set means determines whether the temperature condition is true or false based on the measured intake air temperature.

18. The voltage generator according to claim 1, further comprising:

an abnormal signal output means for outputting an abnormal condition signal when the actual current value measured by the current value measurement means remains below a diagnosis voltage value for a predetermined time length, the abnormal condition signal indicating that the voltage generator is in an abnormal condition; and a diagnosis voltage switch means for setting the diagnosis voltage value to a first voltage value when the target current value of the energization current is set to the first current value and for setting the diagnosis voltage value to a second voltage value less than the first voltage value when the target current value of the energization current is set to the second current value.

19. The voltage generator according to claim 1, wherein the current value measurement means is coupled to the resistor through a low-pass filter circuit.

20. The voltage generator according to claim 1, wherein a first input terminal of the current value measurement means is coupled to one end of the resistor through a second resistor and wherein a second input terminal of the current value measurement means is coupled to the other end of the resistor through a third resistor.

21. The voltage generator according to claim 1, wherein outputs of the current value measurement means are analog values.

22. A method comprising:

configuring a coil of a voltage generator mountable in a vehicle such that an energization current having a target current value flows through the coil, a resistor being coupled to the coil;

determining, based on an operating condition of the vehicle, whether a predetermined set condition is true or false, the target current value of the energization current being set to a first current value when the set condition is false, and the target current value of the energization current being set to a second current value less than the first current value when the set condition is true;

measuring an actual current value of the energization current flowing through the coil based on an amplified voltage across the resistor;

using a switch circuit to determine whether the measured actual current value is less than the set target current value, the switch circuit allowing the energization current to flow through the coil when the measured actual current value is less than the set target current value, and the switch circuit preventing the energization current from flowing through the coil when the measured actual current value is equal to or greater than the set target current value;

generating an output voltage by charging a capacitor by counterelectromotive force produced in the coil;

measuring a voltage value of the output voltage;

determining whether the measured voltage value is less than a predetermined reference voltage value, enabling the switch circuit when the measured voltage value is less than the reference voltage value, and disabling the switch circuit when the measured voltage value is equal to or greater than the reference voltage value; and selectively applying the output voltage to an injector coil of an internal combustion engine of the vehicle using a switching device coupled between a positive terminal of the capacitor and the injector coil;

wherein the set condition includes a drive interval condition, wherein the drive interval condition becomes true when a drive interval at which a fuel injector of the vehicle is driven is equal to or greater than a predetermined time period, wherein the drive interval condition becomes false when the drive interval is less than the predetermined time period, and wherein the drive interval is a time period from when the fuel injector is opened to when the fuel injector is reopened.

23. A voltage generator mountable on a vehicle comprising:

a coil having a first end to which a power supply voltage is applied;

a switching element located in a current path from a second end of the coil to a reference potential lower than the power supply voltage;

a switching controller for turning ON and OFF the switching element;

a diode having an anode connected to a connection point between the switching element and the second end of the coil;

an output voltage generator for generating an output voltage by charging a capacitor by counter electromotive force of the coil, the counter electromotive force produced by ON and OFF operations of the switching element;

a current value setter for setting a target current value for an energization current flowing through the coil;

a current value measurement device for measuring the energization current flowing through the coil; and a voltage value measurement device for measuring the output voltage, wherein the current value setter determines whether a predetermined set condition is true or false, the current value setter setting the target current value to a first current value when the set condition is false, the current value setter setting the target current value to a second current value less than the first current value when the set condition is true, the switch controller turns ON the switching element to energize the coil, when the measured current is less than the target current value, and the measured voltage is less than a predetermined reference voltage, and the switch controller turns OFF the switching element to deenergize the coil, when the measured current reaches the target current value, or the measured voltage reaches the reference voltage;

the output voltage is used to drive a fuel injector of an engine of the vehicle, the set condition includes a drive interval condition, the drive interval condition becomes true when a drive interval at which the fuel injector is driven is equal to or greater than a predetermined time period, and the drive interval condition becomes false when the drive interval is less than the predetermined time period, the drive interval is a time period from when the fuel injector is opened to when the fuel injector is reopened.

* * * * *